(12) United States Patent
Banerjee et al.

(10) Patent No.: US 10,838,781 B1
(45) Date of Patent: Nov. 17, 2020

(54) EVENTUALLY CONSISTENT METADATA EXCHANGE BETWEEN SOFTWARE APPLICATIONS AND SERVICES

(71) Applicant: SAP SE, Walldorf (DE)

(72) Inventors: Rick Banerjee, Bangalore (IN); Karthik Kamath, Bangalore (IN)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 16/446,088

(22) Filed: Jun. 19, 2019

(51) Int. Cl.
*G06F 3/00* (2006.01)
*G06F 9/54* (2006.01)
*G06F 16/907* (2019.01)

(52) U.S. Cl.
CPC .............. *G06F 9/541* (2013.01); *G06F 9/546* (2013.01); *G06F 16/907* (2019.01)

(58) Field of Classification Search
CPC ......................................................... G06F 9/54
USPC ......................................................... 719/310
See application file for complete search history.

(56) References Cited

U.S. PATENT DOCUMENTS

| | | | | |
|---|---|---|---|---|
| 7,617,289 B2 * | 11/2009 | Srinivasan | .......... | H04L 67/1095 707/999.202 |
| 10,270,849 B2 * | 4/2019 | Hunt | ...................... | H04L 67/107 |
| 2004/0057067 A1 * | 3/2004 | Ohishi | ..................... | G06F 9/547 358/1.13 |
| 2009/0011697 A1 * | 1/2009 | Tobita | ................... | H04W 4/021 455/3.01 |
| 2013/0268640 A1 * | 10/2013 | Wu | ...................... | H04L 41/0213 709/221 |
| 2015/0143355 A1 * | 5/2015 | Tingstrom | ................ | G06F 8/65 717/170 |
| 2018/0234508 A1 * | 8/2018 | Tsadok | ..................... | H04L 67/02 |
| 2019/0363884 A1 * | 11/2019 | Johnson | ................ | H04L 63/123 |
| 2020/0007392 A1 * | 1/2020 | Goyal | ................. | H04L 41/0859 |

OTHER PUBLICATIONS

John F Roddick, A survey of schema versioning issues for database systems. (Year: 1995).*

* cited by examiner

*Primary Examiner* — Lechi Truong
(74) *Attorney, Agent, or Firm* — Klarquist Sparkman, LLP

(57) ABSTRACT

Technologies are described for transforming data using exchanged metadata. For example, domain object metadata that defines one or more domain entities can be received. The domain object metadata is associated with a first application. Transformation metadata that defines transformations to be carried out for the one or more domain entities can be received. The transformation metadata is associated with a second application. Data to be transformed can be received (e.g., from the first application). The received data can be transformed according to the transformation metadata. The transformed data can be output (e.g., sent to the second application).

16 Claims, 11 Drawing Sheets

EVENTUALLY CONSISTENT METADATA EXCHANGE BETWEEN SOFTWARE APPLICATIONS AND SERVICES

BACKGROUND

Typical enterprise-level software applications may consist of several monolithic legacy applications designed to serve specific business objectives. With monolithic legacy applications, data is centrally stored in a data store, which is typically a relational database. There is usually a complex domain object model which defines the entities used by the application.

In such software applications, there is often a need to exchange data between the applications. For example, one application can provide data for the entities stored in its data store. The data can be provided to other applications which consume the data. However, in some situations, the producer application and the consumer application have different data formats. As a simple example, a first application could operate on data that includes a customer name that is a single field while a second application could operate on data that includes a customer name that is divided into a first name field and a second name field. As another example, some of the data produced by the first application could be produced in plain text while the consumer application may need the data in an encrypted format. Due to the differences in data formats, data may have to be transformed when it is provided between the applications.

In typical solutions, data transformations are carried out by the application that is providing the data. However, performing data transformations may not be the primary role of the application and can cause undue load on the application, which can result in delays and errors.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Various technologies are described herein for transforming data using exchanged metadata. For example, domain object metadata that defines one or more domain entities can be received. The domain object metadata is associated with a first application. Transformation metadata that defines transformations to be carried out for the one or more domain entities can be received. The transformation metadata is associated with a second application. Data to be transformed can be received (e.g., from the first application). The received data can be transformed according to the transformation metadata. The transformed data can be output (e.g., sent to the second application).

The domain object metadata and the transformation metadata can be associated with a first version. A request for transformed data using a second version of domain object metadata and transformation metadata can be received. When the first version matches the second version, the data can be transformed and sent (e.g., to the second application).

DETAILED DESCRIPTION

Overview

The following description is directed to technologies for transforming data using exchanged metadata. For example, domain object metadata that defines one or more domain entities can be received. The domain object metadata is associated with a first application. Transformation metadata that defines transformations to be carried out for the one or more domain entities can be received. The transformation metadata is associated with a second application. Data to be transformed can be received (e.g., from the first application). The received data can be transformed according to the transformation metadata. The transformed data can be output (e.g., sent to the second application)

The domain object metadata and the transformation metadata can be associated with a current metadata version (e.g., a specific version number, such as version zero). In some situations, requests can be received from applications for transformed data using a new metadata version (e.g., version one). In this situation, there is a metadata mismatch between the current metadata version being used to transform the data and the new metadata version for which transformed data is being requested. However, even in this situation, transformation of the received data can continue with the expectation that the metadata will eventually become consistent. In a typical scenario, a new version (e.g., version one) of the domain object metadata and the transformation metadata will be received. Any previously transformed data (e.g., that used version zero) will have been buffered. The previously transformed data can be checked to see if it would change due to the new version, and that portion that would change can be re-transformed. Using this procedure, transformation of received data does not have to be blocked due to a metadata mismatch, and after the metadata becomes consistent, previously transformed data can be efficiently re-processed if needed.

Application Environment for Providing Data

Figure 1:
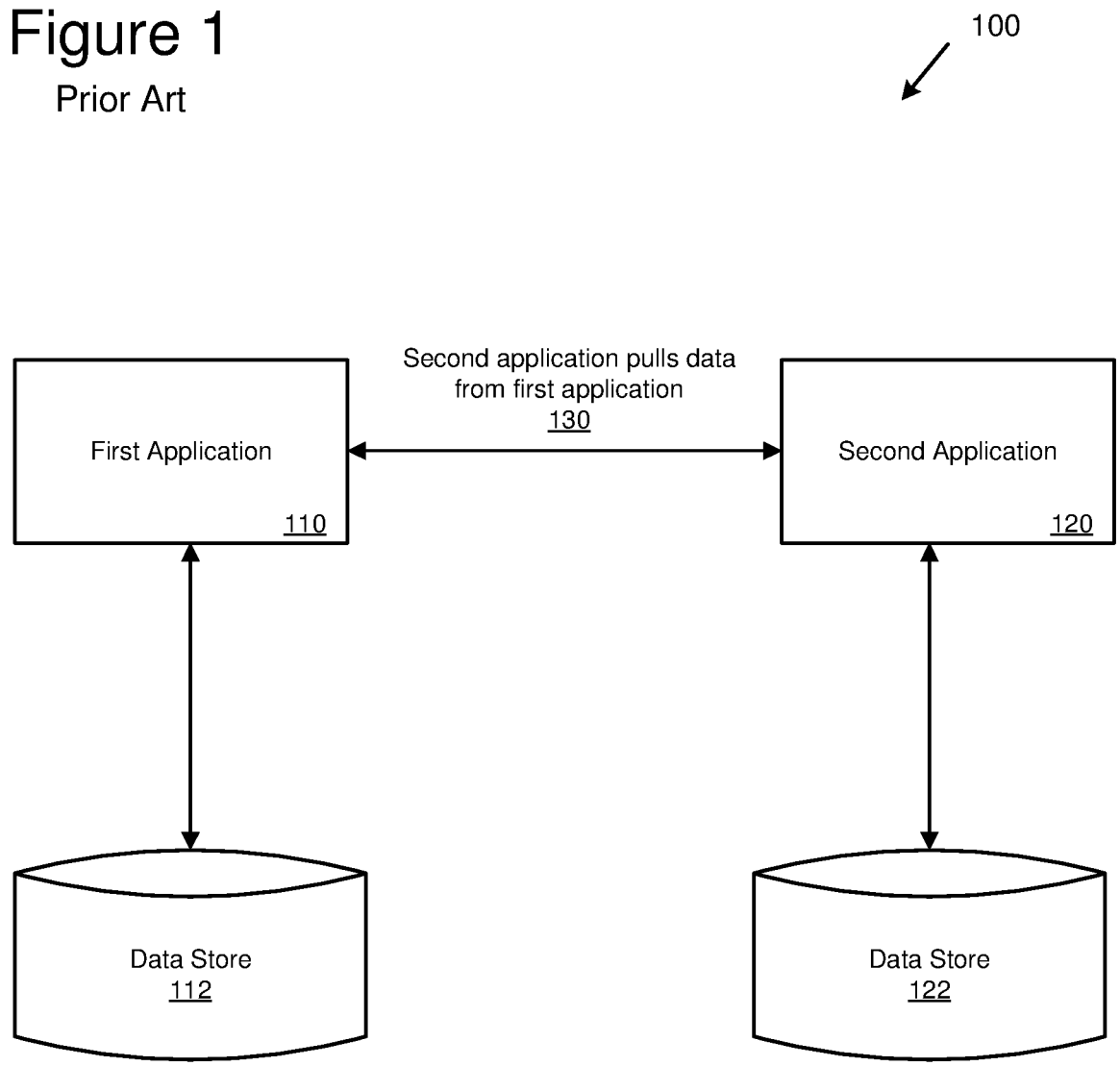
FIG. 1 is a diagram depicting an example application environment for exchanging data.

FIG. 1 is a diagram depicting an example prior art environment 100 in which data is provided from a first application 110 to a second application 120. In order for the data produced by the first application 110 (also referred to as a producer or data producer) to be usable by the second application 120 (also referred to as a data consumer or consumer), the data needs to be represented in a manner in which the second application 120 can consume. For example, the first application 110 can produce data is in a first representation (e.g., a format using specific data fields, types, etc.) and the second application 120 consumes data that is in a different representation. Therefore, in order for the data to be usable by the second application 120, the data needs to be transformed.

In more detail, the first application 110 obtains (extracts) data from a data store 112 (e.g., a relational database, a document store, a key value store, or another type of data store). The first application 110 performs a transformation on the obtained data. For example, the first application 110 could transform the obtained data by combining data fields, separating data fields, reformatting data, encrypting data, decrypting data, performing language translations, performing calculations, and/or performing other types of data transformations. The transformed data is then provided to the second application 120. The second application 120 can store the transformed data in a data store 122 and/or use the transformed data for some other purpose (e.g., data analytics).

In some implementations, the second application 120 pulls the transformed data from the first application 110, as depicted at 130. For example, the second application 120 could request specific data from the first application 110 (e.g., the second application 120 could request data for performing data analytics). The second application 120 could request transaction data from the first application 110. In some implementations, the second application 120 pulls master data from the first application 110. Master data refers to common data that does not vary between applications. For example, master data could include user data, group data, product data, etc.

In some implementations, the first application 110 and second application 120 operate as part of a legacy application environment. For example, the first application 110 and/or the second application 120 can be a legacy application (e.g., a monolithic legacy application) operated as a software-as-a-service (Saas). The first application 110 and/or the second application 120 can support a specific business objective (or objectives). For example, the first application 110 and/or the second application 120 can serve a particular domain (e.g., a business domain, such as a procurement domain). In a specific implementation, the first application 110 and the second application 120 are legacy procurement systems operating as part of an SAP® Ariba® procurement solution.

The described operations that are performed by the first application 110 and the second application 120 can be performed by hardware and/or software resources. For example, the described operations (e.g., obtaining data, transforming data, pulling data, pushing data, generating combined metadata, checking metadata versions, etc.) can be performed by various computing hardware resources (e.g., computer servers or other types of computing devices, virtual computing resources, data storage resources, network resources, etc.) and/or software resources (e.g., application software, database software, etc.).

The arrangement depicted in FIG. 1 in which the first application 110 obtains data from its data store 112, transforms the data, and provides the data to the second application 120 suffers from a number of performance issues. One issue is caused by the additional load imposed on the first application 110 in order to perform the data transformation operations. In typical environments, the primary job of the first application 110 is not transforming data for other systems (e.g., the primary responsibility of the first application 110 could be a live transaction system). Therefore, the additional load (e.g., processor load, memory load, network load, etc.) imposed on the first application 110 can adversely affect system performance (e.g., primary operations performed by the first application 110 can be disrupted or slowed). Another issue is caused by the additional load on the data store 112 (e.g., database connections, memory utilization by the first application 110 and/or the data store 112, network bandwidth, etc.). Because the first application 110 needs to obtain data from its data store 112 to service the requests from other application (e.g., from the second application 120), access to the data store 112 for primary operations can be negatively impacted.

A potential solution to this problem is to use a separate transformation service. The separate transformation service can receive data from the first application 110, perform data transformation operations, and provide the transformed data to the second application 120. In some implementations, the transformation service is implemented as a microservice. Offloading the transformation task from the first application 110 to the transformation service reduces the load on the first application 110 (e.g., reduces processor load, memory load, etc.) and provides benefits in terms of horizontal scaling.

While having a separate transformation service provides benefits, it also introduces new issues. For example, in order to carry out the transformation operations, the transformation service needs to obtain information (e.g., metadata) from first application 110 and/or the second application 120. The information obtained by the transformation service from the first application 110 can describe the format and content of the data. The information obtained from the second application 120 can describe the specific transformations to be performed by the transformation service. A new issue can be introduced if the information from the first application 110 is out of sync with the information obtained from the second application 120. For example, if the first application 110 is updated (e.g., by modifying the data fields or attributes) then the data provided by the first application 110 may not match the transformations requested by the second application 120. This situation can also be caused by a difference in the upgrade cycles of the various application of the environment, including the first application 110, the second application 120, and the transformation service.

Metadata

In the technologies described herein, metadata is exchanged between applications (e.g., transaction applications, data analysis applications, services, etc.). The metadata is used when exchanging data between applications. For example, domain object metadata defines domain entities for data produced by a first application and transformation metadata defines how that data is transformed and provided to a second application. For example, metadata can be exchanged between a first application and a transformation service, and between a second application and the transformation service. The transformation service can use the received metadata to transform data. Metadata versions can be used so that the produced data is in sync with the consumed data. However, data production and transformation can still be carried out when metadata versions are not consistent, and any inconsistent data can be re-processed (e.g., re-transformed) when consistent metadata is received.

In general, there are two types of metadata produced by the applications. The first type of metadata is domain object metadata. Domain object metadata defines the domain entities (also referred to as domain objects) that are managed by a given application (e.g., by the first application 110). The domain object metadata can include definitions such as names (e.g., entity names), fields, types, tags, attributes, etc. The domain entities can be organized into an entity hierarchy. For example, a procurement domain can have child entities such as requisitions, invoices, etc. Each entity can have fields (e.g., an invoice entity could have an invoice number field, an invoice amount field, etc.), types, tags, attributes, etc.

Below is listed an example of domain object metadata. The example domain object metadata describes a requisition entity within a purchasing application. The example domain object metadata defines a number of fields, which have names, types, tags, and other attributes and their associated values.

```
{
  "entityName": "ariba.purchasing.core.Requisition",
  "fields": [
  {
    "name": "internalorder",
    "type": "VARCHAR",
    "jsonPath": "$.LineItems[*].Accountings.InternalOrder",
    "piiSensitive": false
  },{
    "name": "description",
    "type": "VARCHAR",
    "jsonPath": ".LineItems[*].Description",
    "piiSensitive": false
  },{
    "name": "postaladdress",
    "type": "VARCHAR",
    "jsonPath": ".PostalAddress.Lines",
    "piiSensitive": true
  },{
    "name": "price",
    "type": "DOUBLE",
    "jsonPath":"$.LineItems[*].CategoryDetailsVector[*].Price",
    "piiSensitive": false
  },
  . . .
}
```

The above example domain object metadata describes one entity in JavaScript Object Notation (JSON) format. However, in general the domain object metadata can describe any number of entities and can be provided in any format.

The second type of metadata is transformation metadata. Transformation metadata defines the transformations that need to be carried out so that the application receiving the transformed data can utilize it (e.g., the application receiving the transformed data can have specific requirements for data fields, types, formatting, encryption, etc.). The transformation metadata can be provided by the application that will be receiving data that has been transformed according to the provided transformation metadata.

Below is listed an example of transformation metadata. The example transformation metadata describes how data that is provided according to the above example domain object metadata will be transformed for use by the receiving system.

```
{
  "SourceEntityName": "ariba.purchasing.core.Requisition",
  "TargetEntityName": "ariba.analysis.PurchaseRequest",
  "fields": [{
    "sourceFieldName": "internalorder",
    "targetFieldsName": ["OrderId", "OrderNumber"],
    "applyTransformation": "None" },{
    "sourceFieldName": "description",
    "targetFieldsName": ["OrderDetails"],
    "applyTransformation": "LocaleTranslation"
  },{
    "sourceFieldName": "postaladdress",
    "targetFieldsName": ["Destination"],
    "applyTransformation": "None"
  {,}
    "sourceFieldName": "price",
    "targetFieldsName": ["Cost"],
    "applyTransformation": "ApplyForex"
  },
  . . .
}
```

As defined by the above example transformation metadata, a number of transformations will be carried out to transform Requisition entity data received from a first application into PurchaseRequest entity data for use by a second application. The above example transformation metadata describes the transformation for one entity in JSON format. However, in general the transformation metadata can describe any number of entities and can be provided in any format.

Using the above example domain object metadata and transformation metadata, transformations can be carried out for data provided between systems. In this example, when data containing a Requisition entity is provided, it is transformed into a PurchaseRequest entity. As part of the transformation, the "internalorder" field is mapped to two target fields, an "OrderId" field and an "OrderNumber" field. In addition, the "description" field is mapped to an "OrderDetails" field and a language translation is applied to the field data. The "postaladdress" field is mapped to a "Destination" field. Finally, the "price" field is mapped to a "Cost" field with a currency transformation.

Application Environment Using Exchanged Metadata

Figure 2:
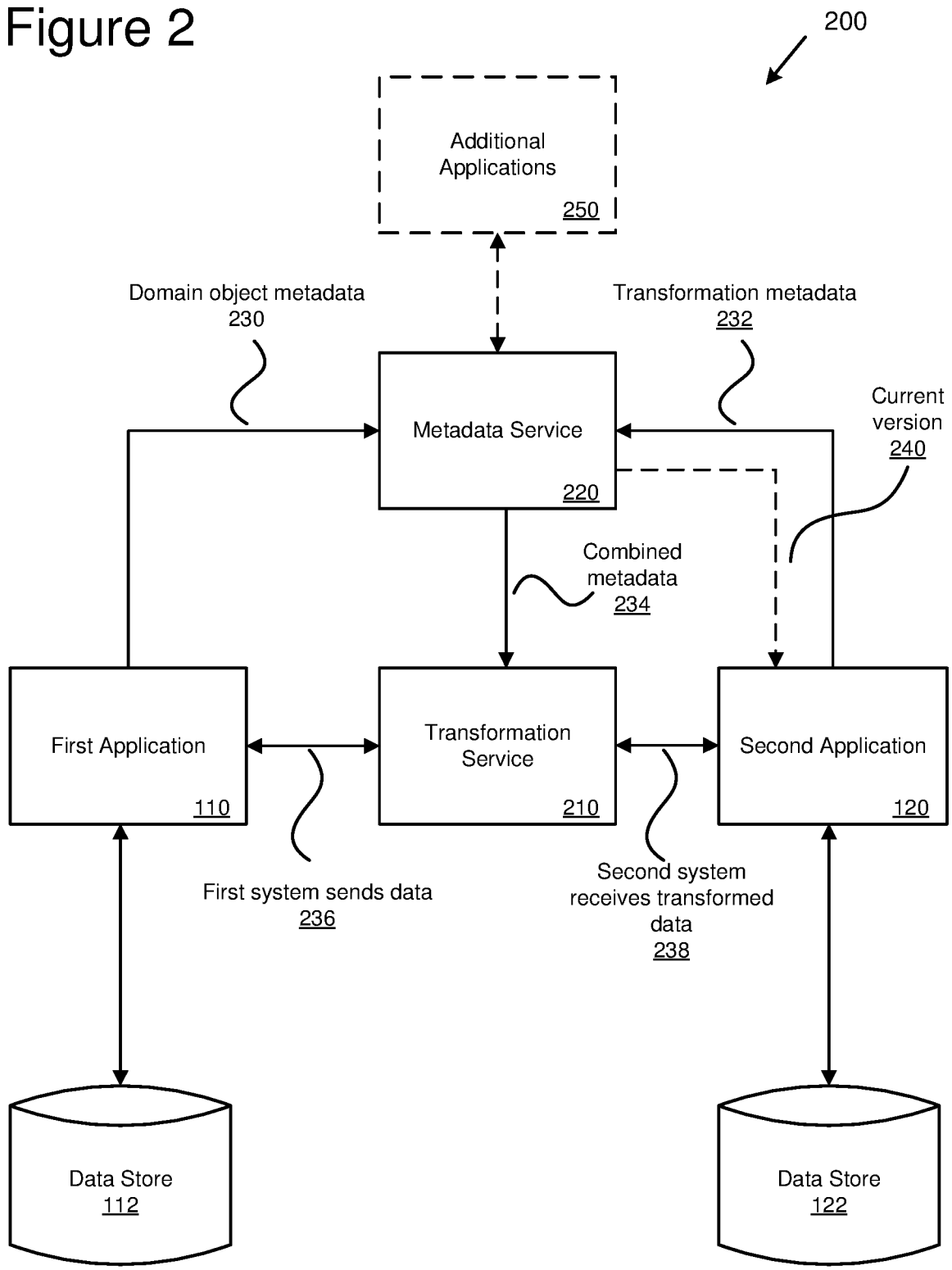
FIG. 2 is a diagram depicting an example application environment for transforming data using exchanged metadata.

FIG. 2 is a diagram depicting an example application environment 200 for transforming data using exchanged metadata. In the example application environment 200, the first application 110 sends domain object metadata 230 to a metadata service 220. For example, the first application 110 can send domain object metadata 230 to the metadata service 220 as part of an initial metadata exchange (e.g., when the first application 110 starts up) and/or whenever there has been an update to the domain object metadata 230 (e.g., when a new field has been added to a domain entity associated with data stored or managed by the first application 110).

In the example application environment 200, the second application 120 sends transformation metadata 232 to a metadata service 220. For example, the second application 120 can send transformation metadata 232 to the metadata service 220 as part of an initial metadata exchange (e.g., when the second application 120 starts up) and/or whenever there has been an update to the transformation metadata 232

(e.g., when a new field has been added to a domain entity associated with data that the second application 120 receives).

The metadata service 220 receives the domain object metadata 230 and the transformation metadata 232. The metadata service 220 combines the domain object metadata 230 and the transformation metadata 232 and sends the combined metadata 234 to the transformation service 210. For example, the metadata service 220 combines the domain object metadata 230 and the transformation metadata 232 in a single file (e.g., as a concatenation), or in another format.

Below is an example of combined metadata that is a combination of above example domain object metadata and the above example transformation metadata. The example combined metadata also includes an additional "emailaddress" field (e.g., added in a new version) along with corresponding delta metadata, which is discussed further below.

```
{
  "metadataVersion": 1.0,
  "domainObjectMetadata": [
    {
      "entityName": "ariba.purchasing.core.Requisition",
      "fields":
      {
        "name": "internalorder",
        "type": "VARCHAR",
        "jsonPath": ".LineItems[*].Accountings.InternalOrder",
        "piiSensitive": false
      },{
        "name": "description",
        "type": "VARCHAR",
        "jsonPath": "$.LineItems[*].Description",
        "piiSensitive": false
      },{
        "name": "postaladdress",
        "type": "VARCHAR",
        "jsonPath": ".PostalAddress.Lines",
        "piiSensitive": true
      },{
        "name": "price",
        "type": "DOUBLE",
        "jsonPath":"$.LineItems[*].CategoryDetailsVector[*].Price",
        "piiSensitive": false
      },{
        "name": "emailaddress",
        "type": "VARCHAR",
        "jsonPath":".EmailAddress.Lines",
        "piiSensitive": true
      }
      ]
    },
  ],
  "transformationMetadata":
  {
    "SourceEntityName": "ariba.purchasing.core.Requisition",
    "TargetEntityName": "ariba.analysis.PurchaseRequest",
    "fields":
    {
      "sourceFieldName": "internalorder",
      "targetFieldsName": ["OrderId", "OrderNumber"],
      "applyTransformation": "None"
    },{
      "sourceFieldName": "description",
      "targetFieldsName": ["OrderDetails"],
      "applyTransformation": "LocaleTranslation"
    },{
      "sourceFieldName": "postaladdress",
      "targetFieldsName": ["Destination"],
      "applyTransformation": "None"
    },{
      "sourceFieldName": "price",
      "targetFieldsName": ["Cost"],
      "applyTransformation": "ApplyForex"
    },{
      "sourceFieldName": "emailaddress",
      "targetFieldsName": ["EmailId"],
      "applyTransformation": "ApplyEncryption"
    }
    ]
  }
  ],
  "metadataDelta": [
    {
      "SourceEntityName": "ariba.purchasing.core.Requisition",
      "TargetEntityName": "ariba.analysis.PurchaseRequest",
      "newFields": [
        {
          "sourceFieldName": "emailaddress",
          "targetFieldsName": ["EmailId"],
          "applyTransformation": "ApplyEncryption"
        }
      ]
    }
  ]
}
```

The first application 110 sends (e.g., pushes) data to the transformation service 210 to be transformed, as depicted at 236. The second application 120 receives (e.g., pulls) transformed data from the transformation service 210, as depicted at 238.

The combined metadata 234 can be associated with a version (e.g., a version number or other type of version identifier). For example, a first version of combined metadata 234 can be tagged as version zero (v0) and comprise the initial domain object metadata 230 from the first application 110 and the initial transformation metadata 232 from the second application 120. The first version of the combined metadata 234 can be sent to the transformation service 210. When the metadata service 220 receives updated domain object metadata 230 and/or updated transformation metadata 232, the metadata service 220 can generate a new version of the combined metadata 234. For example, upon receiving updated domain object metadata 230 and/or updated transformation metadata 232, the metadata service 220 generates version one (v1) of the combined metadata 234 and sends it to the transformation service 210.

In some implementations, the metadata service 220 sends the current metadata version (e.g., the current version of the combined metadata 234 that has been generated by the metadata service 220 and sent to the transformation service 210) to the second application 120, as depicted at 240. The second application 120 can use the current metadata version when requesting (e.g., pulling) data from the transformation service 210. For example, if the current version of the combined metadata 234 is v1, then the second application 120 can request transformed data from the transformation service 210 that has been transformed using v1 of the combined metadata 234. By sending the current metadata version to the second application 120, as depicted at 240, the metadata service 220 can signal to the second application 120 that the transformation service 210 now has the current version and the second application 120 can start pulling data that has been transformed using the current version.

In some implementations, there is no metadata service 220 and the operations that would be performed by the metadata service 220 can be performed by other applications (e.g., by other services or software systems). For example, the transformation service 210 can receive the domain object metadata 230 and/or the transformation metadata 232. The transformation service 210 can generate combined metadata and manage the metadata versions.

The example application environment 200 illustrates the data transformation and metadata exchange operations using two applications, the first application 110 and the second application 120. The first application 110 is also referred to as a producer application because it produces data for transformation. The second application 120 is also referred to as a consumer application because it consumes transformed data. The environment also supports additional producer and/or consumer applications, as depicted at 250. The additional producer applications can provide their domain object metadata to the metadata service 220. The additional consumer applications can provide their transformation metadata to the metadata service 220. Data for transformation can be provided by the first application 110 and/or any of the additional producer applications to the transformation service 210. Transformed data can be provided to the second application 120 and/or any of the additional consumer applications. In some implementations, a producer application can also be a consumer application (e.g., the application could be a producer application for certain domain entities and a consumer application for other domain entities).

Figure 3:
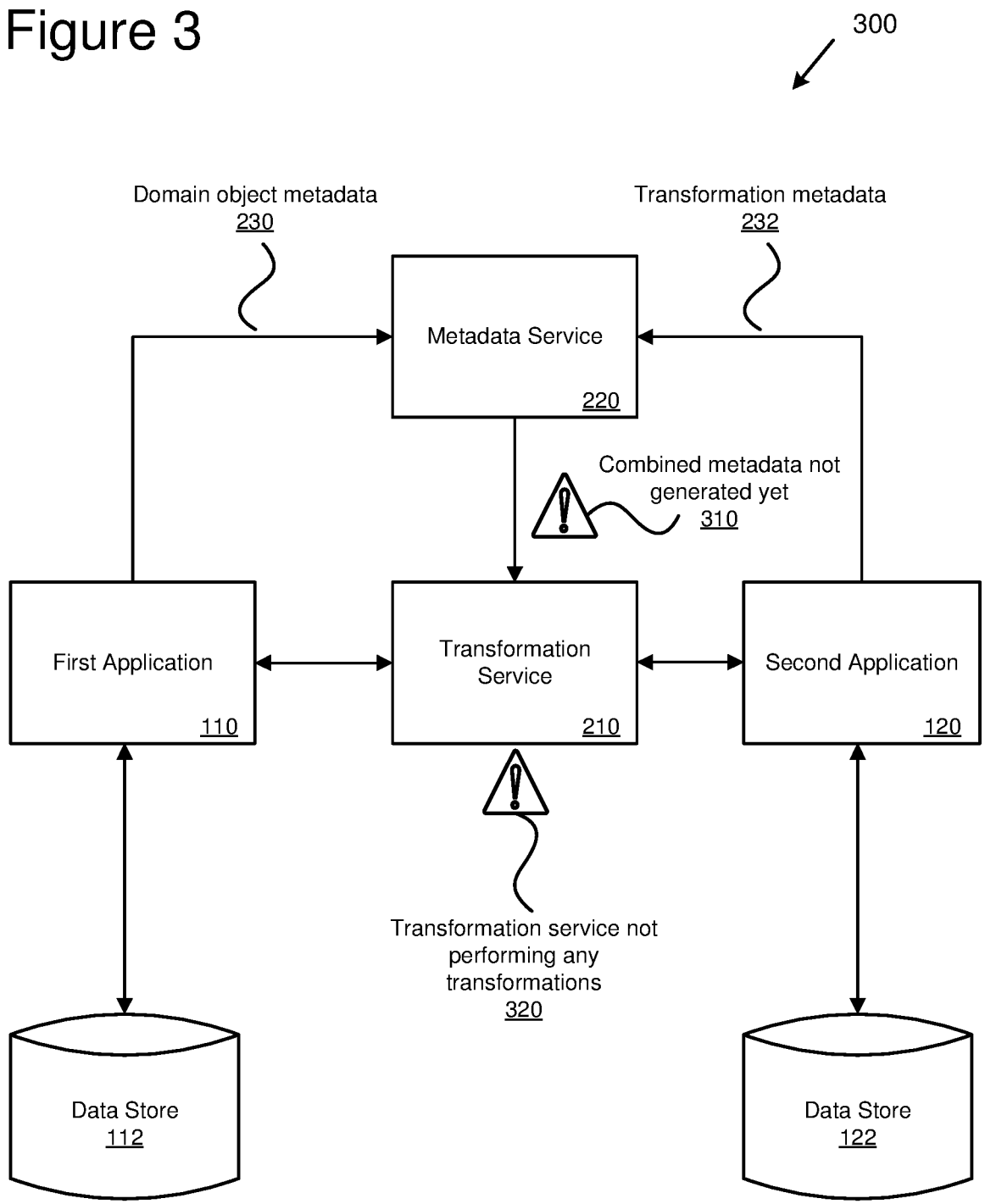
FIG. 3 is a diagram depicting a startup procedure for transforming data using exchanged metadata.

FIG. 3 is a diagram depicting a startup procedure within an example application environment 300 for transforming data using exchanged metadata. For example, the example application environment 300 can be used to illustrate what happens when the first application 110 and the second application 120 initially send metadata to the metadata service 220 (e.g., upon startup of the first application 110 and the second application 120).

At the point in time illustrated in the example application environment 300, the first application 110 has sent its initial domain object metadata 230 to the metadata service 220 and the second application 120 has sent its initial transformation metadata 232 to the metadata service 220. However, the metadata service 220 has not yet generated the combined metadata or sent the combined metadata to the transformation service 210, as depicted at 310. Because the transformation service 210 does not have the combined metadata, the transformation service 210 cannot perform any data transformations, as depicted at 320.

The first application 110 may still try to send data to the transformation service 210 to be transformed. However, because the transformation service 210 does not have the combined metadata, no transformations can be performed. For example, the first application 110 can be informed that the transformation service 210 is not ready to accept data (e.g., by receiving an explicit message or alert form the transformation service 210, by not receiving an acknowledgement to data sent to the transformation service 210, etc.). The first application 110 can buffer the data and try again later (e.g., set a timer to retry in a number of seconds or minutes).

Similarly, the second application 120 may try to retrieve transformed data from the transformation service 210. However, because the transformation service 210 does not have the combined metadata, it will not provide transformed data to the second application 120. For example, the transformation service 210 can respond with a message indicating that no transformed data is available at this time The second application 120 can try again later (e.g., set a time to retry in a number of seconds or minutes).

Figure 4:
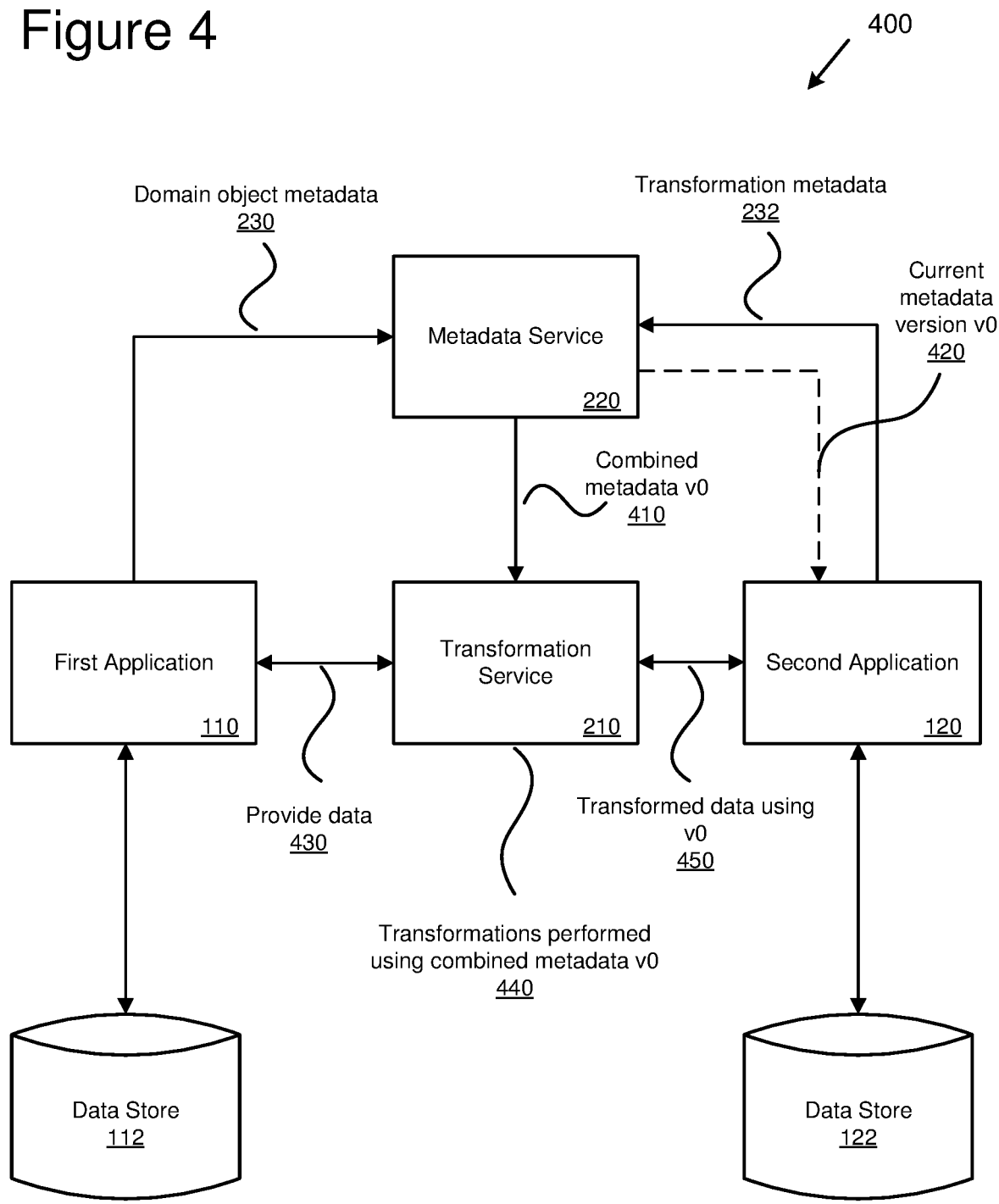
FIG. 4 is a diagram depicting a data exchange using a current metadata version.

FIG. 4 is a diagram depicting a data exchange within an example application environment 400 using a current metadata version. In this example, the metadata service 220 has generated the first version of the combined metadata, designated v0, and provided it to the transformation service 210, as depicted at 410. The example application environment 400 can represent the state of the environment after the example application environment depicted in FIG. 3.

The transformation service 210 receives the combined metadata v0 and is now ready to process received data. As depicted at 430, the first application 110 provides (e.g., pushes) data to the transformation service 210. The transformation service 210 transforms the received data using the combined metadata v0, as depicted at 440. The transformation service 210 provides the transformed data (e.g., in response to a pull request from the second application 120) to the second application 120, as depicted at 450.

In some implementations, the metadata service 220 informs the second application 120 of the current combined metadata version that is being used by the transformation service 210. In this example, the metadata service 220 informs the second application 120 that metadata version v0 is currently in use, as depicted at 420. The second application 120 can use the current version when requesting (e.g., pulling) transformed data from the transformation service 210.

The example application environment 400 illustrates operation during which the metadata versions are consistent. Specifically, the current version of the combined metadata used by the transformation service 210 is v0, and the current version of the combined metadata expected by second application 120 is also v0 (e.g., the second application 120 requests transformed data using v0 from the transformation service 210). Therefore, the metadata versions match.

Figure 5:
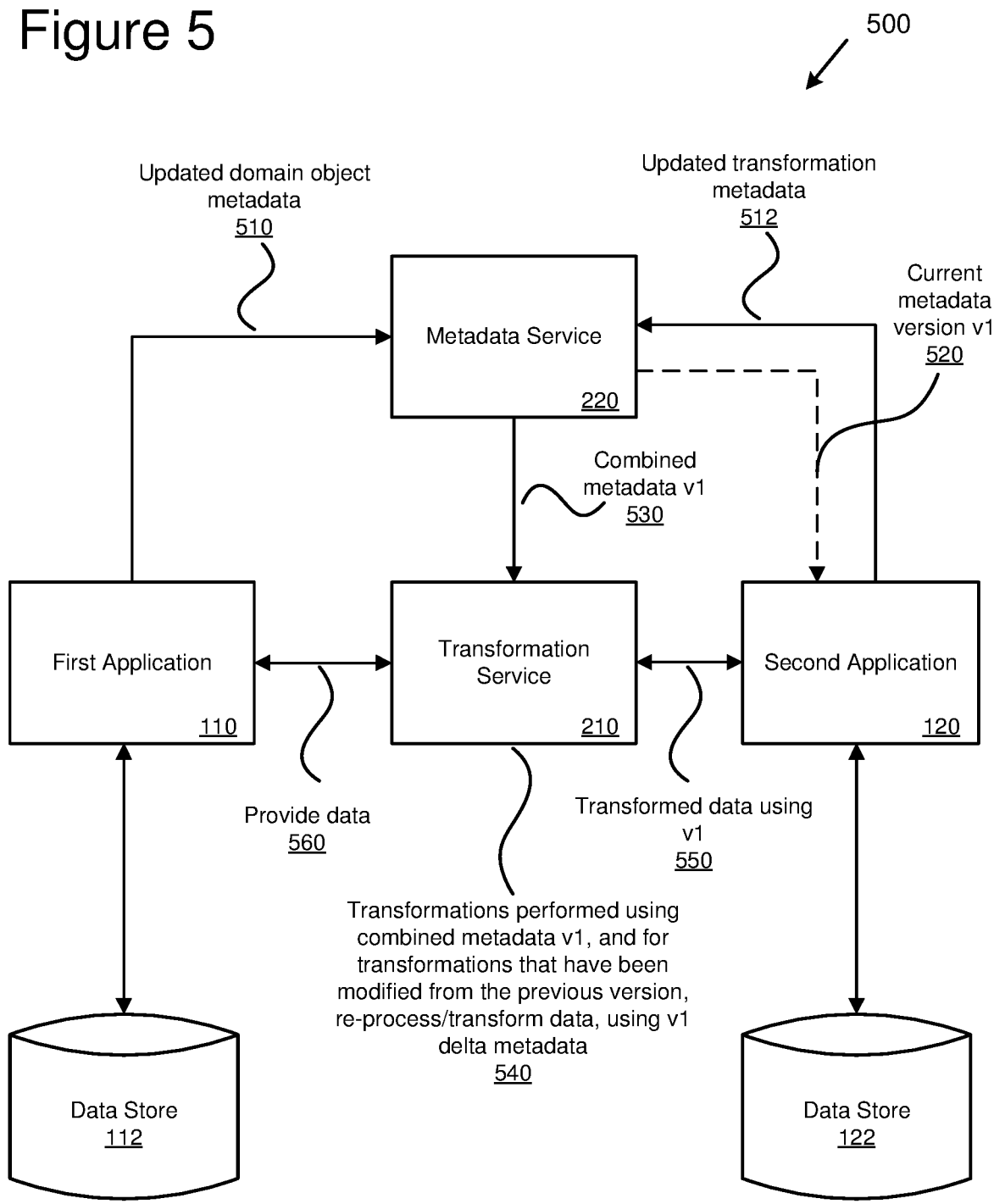
FIG. 5 is a diagram depicting a data exchange using a new metadata version.

FIG. 5 is a diagram depicting a data exchange within an example application environment 500 using a new metadata version. The example application environment 500 can be a continuation of the example application environment depicted in FIG. 4. In this example, the first application 110 has provided updated domain object metadata 510 and the second application 120 has provided updated transformation metadata 512. From the updated domain object metadata 510 and the updated transformation metadata 512, the metadata service 220 has generated a new combined metadata version, combined metadata v1 530. The metadata service 220 has provided the combined metadata v1 530 to the transformation service 210. The metadata service 220 can also inform the second application 120 that the current metadata version is now v1, as depicted at 520.

Once the transformations service 210 has the combined metadata v1, the first application 110 can provide data, as depicted at 560, to the transformation service 210, the transformations service 210 can transform received data using the combined metadata v1, as depicted at 540, and the transformed data can be sent to the second application 120, as depicted at 550.

However, there can be a period of time during which the metadata versions are not consistent (i.e., they are inconsistent). This situation can occur after the metadata service 220 generates the combined metadata v1 and informs the transformation service 210, and while the transformation service 210 still has transformed data for v0 that has not yet been sent to the second application 120 (e.g., the transformation service 210 is waiting for the next pull request). When this happens, the transformation service 210 can review the buffered transformed data and separate that portion of the buffered transformed data that does not change in light of the combined metadata v1. The portion that does not change can be sent to the second application 120 (i.e., without having to be re-transformed using combined metadata v1). For the portion that does change, the transformation service 210 can re-transform that data and send it to the second application 120. Using this approach, the exchanged metadata will eventually become consistent (e.g., once the transformation service receives and begins using v1).

This situation can also occur after the metadata service 220 generates the combined metadata v1 and informs the second application 120, but before the transformation service 210 is using the combined metadata v1 (e.g., the transformation service 210 may not have received the combined metadata v1 due to a network issue or may not have had time to update its metadata cache). When this happens, the second application 120 will request transformed data from the transformation service 210 that has been transformed using v1 of the combined metadata. When this happens, the transformation service 210 can continue to receive data from the first application 110 and transform the data using combined metadata v0. The transformation service 210 can buffer the transformed data. The transformation service 210 can inform the second application 120 of the issue (e.g., send a metadata version mismatch error), and the second application 120 can try again at a later time. When the transformation service 210 receives and/or loads the combined metadata v1 530, the transformation service 210 can review the buffered transformed data and separate that portion of the buffered transformed data that does not change in light of the combined metadata v1. That portion that does not change can be sent to the second application 120 (i.e., without having to be re-transformed using the combined metadata v1). For the portion that does change, the transformation service 210 can re-transform that data and send it to the second application 120. Using this approach, the exchanged metadata will eventually become consistent (e.g., once the transformation service receives and begins using v1).

This approach provides improvements in terms of processing efficiency and resource utilization. For example, the transformation service 210 can continue transforming data with the likely result that only a small portion will have to be re-transformed when the new metadata version is received, which improves system responsiveness and reduces delays that would otherwise occur if processing were to be blocked. In addition, by only re-transforming the portion of data that would change under the new version, computing resources utilization is reduced. Furthermore, the first application 110 can continue to send data to the transformation service 210 during this time (i.e., the first application 110 is not blocked).

In some implementations, when a new version of combined metadata is generated, the combined metadata also includes information indicating the chances since the previous version, which is referred to as a delta. For example, if combined metadata v2 is generated, then it can include an indication of what changed in relation to combined metadata v1. This delta between the current metadata version and the previous metadata version can be used to identify transformed data that needs to be re-transformed. For example, the transformation service 210 can use the delta to more efficiently review data that has been buffered because it was transformed using the previous metadata version.

Below is listed an example delta between a previous metadata version and a current metadata version. In the example, the "emailaddress" field has been added to the Requisition domain object in the current version of the domain object metadata and a corresponding addition (the "EmailID" field has been added to the current version of the transformation metadata. The transformation service 210 can use this delta to more efficiently review data that has been transformed and buffered due to use of a previous metadata version. For example, the transformation service 210 can review the buffered data to see if any of the data has a source "emailaddress" field, and if so, re-transform only that data that does have the source "emailaddress" field.

```
{
    "SourceEntityName": "ariba.purchasing.core.Requisition",
    "TargetEntityName": "ariba.analysis.PurchaseRequest",
    "newFields": [{
        "sourceFieldName": "emailaddress",
        "targetFieldsName": ["EmailId"],
        "applyTransformation": "ApplyEncryption"
    }]
}
```

Methods for Transforming Data Using Exchanged Metadata

In the technologies described herein, methods can be provided for transforming data using exchanged metadata. For example, a transformation service can receive domain object metadata and transformation metadata (e.g., directly or as combined metadata from another source, such as a metadata service). The transformation service can receive data from a source (e.g., a first application) that has been formatted according to the domain object metadata and transform the received data according to the transformation data. The transformation service can send the transformed data to a destination (e.g., a second application).

Figure 6:
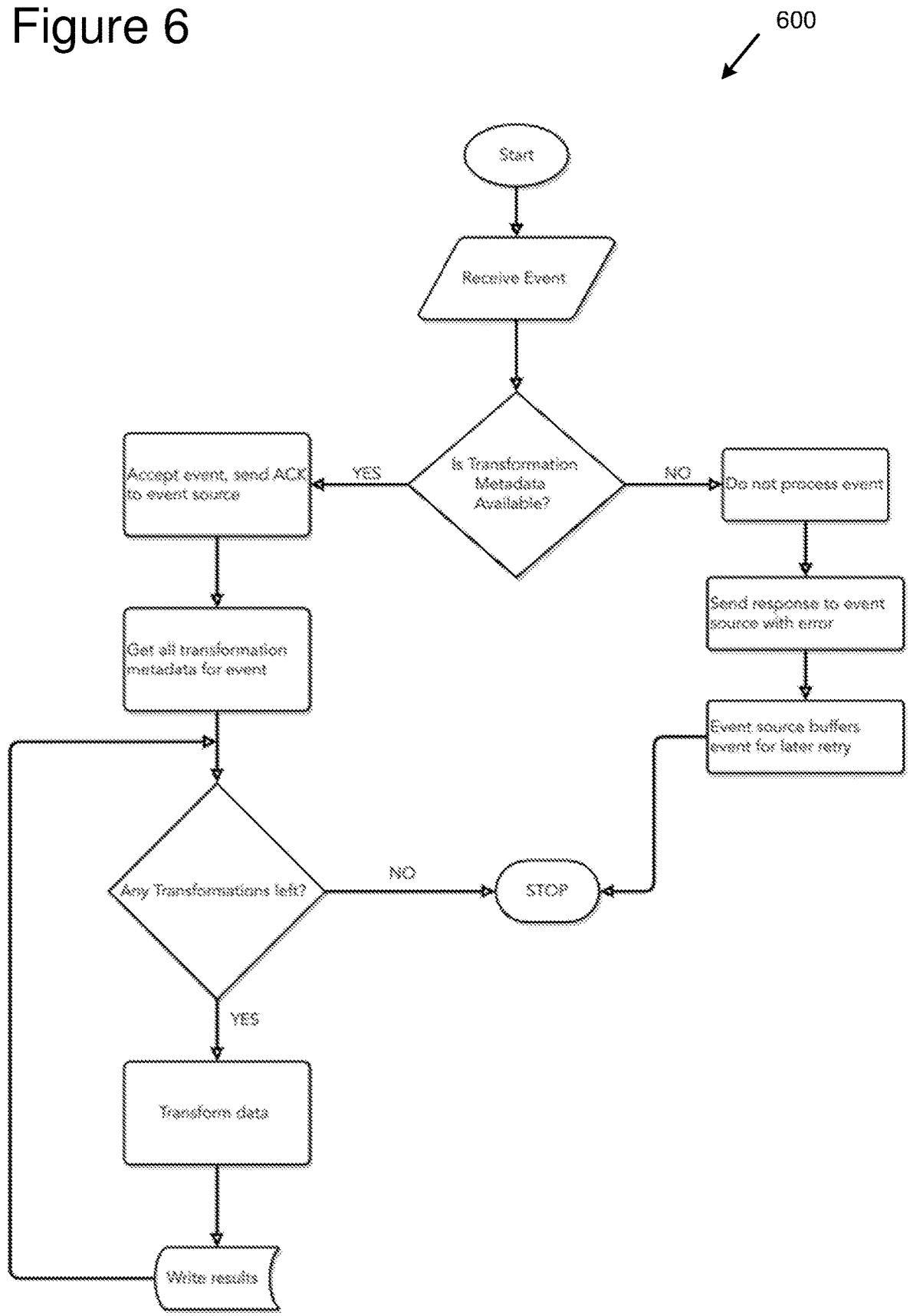
FIG. 6 is a flowchart of an example method for transforming data depending on whether transformation metadata is available.

FIG. 6 is a flowchart of an example method 600 for transforming data depending on whether transformation metadata is available. For example, the example method 600 can be performed as part of a start-up procedure during which the transformation service may not have received any metadata. The example method 600 can be performed by a transformation service (e.g., by transformation service 210). As depicted in the example method 600, an event is received. The event represents data that needs to be transformed. The event can be received from an application (e.g., a legacy application, a service or microservice, or from another type of software system), such as from the first application 110. If transformation metadata is available (e.g., if the transformation service has received combined metadata), then the event is accepted (e.g., an acknowledgement is sent to the first application). The transformation metadata needed to perform the transformations is obtained (e.g., from a metadata cache) and then the transformations are carried out (e.g., for each domain entity in the received data). The transformed data can be output (e.g., saved to a buffer or persistent data store, sent to a second application, etc.). If transformation metadata is not available (e.g., if the transformation service has just started and has not yet received any metadata), then the event is not processed. A response (e.g., an error message) can be sent to the event source (e.g., the first application). The event source can buffer the data and try again later (e.g., after a timeout period).

Figure 7:
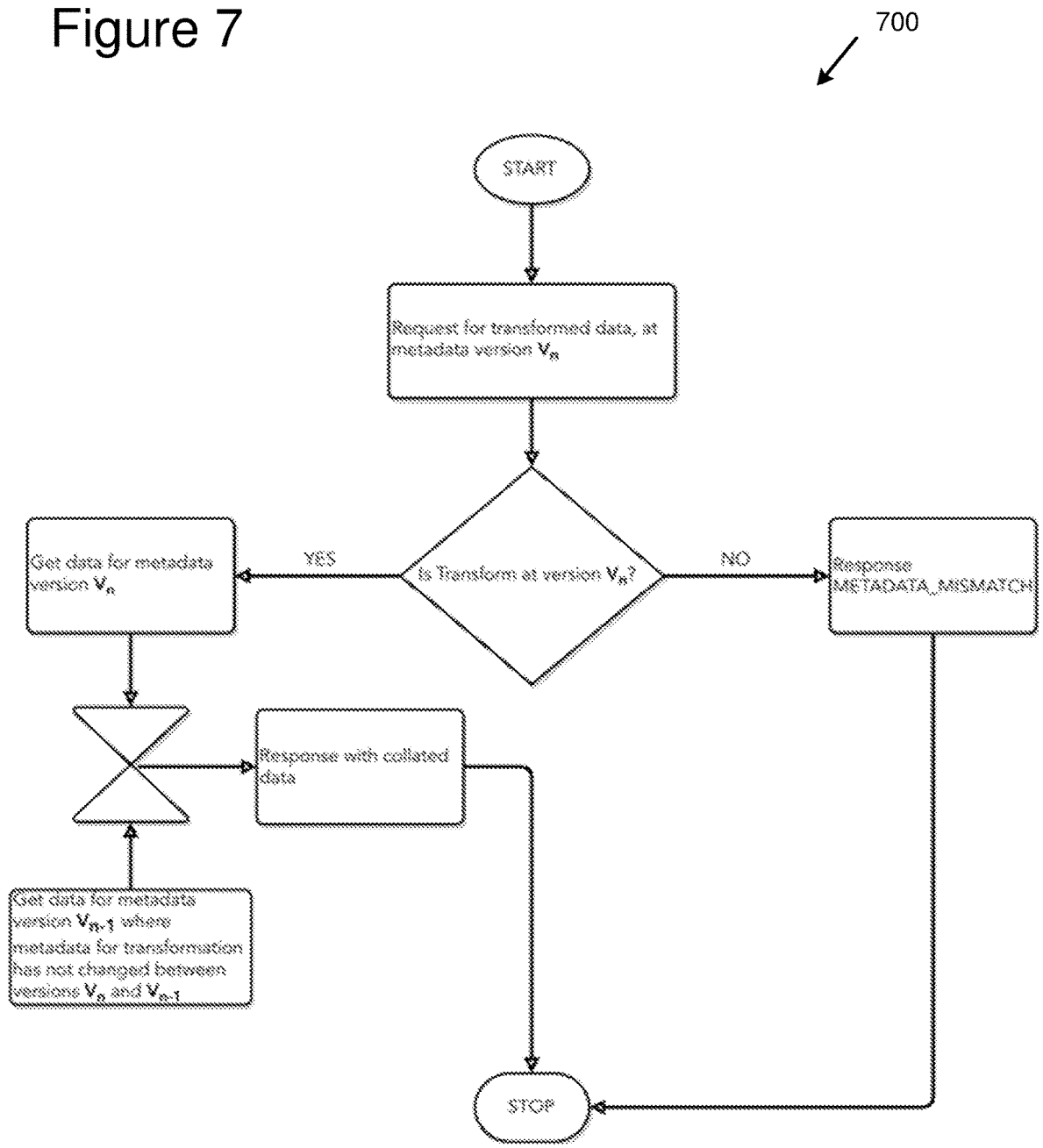
FIG. 7 is a flowchart of an example method for responding to a request for transformed data.

FIG. 7 is a flowchart of an example method 700 for responding to a request for transformed data. For example, the example method 700 can be performed by a transformation service (e.g., by transformation service 210) when the transformation service receives a request (e.g., from second application 120) for transformed data. As depicted in the example method 700, a request is received for transformed data using metadata version n ($V_n$). If the transformation service is running version n, then transformed data for version n is obtained along with any data that was transformed using the previous version (n−1) that does not change due to the current version n. The transformed data is combined and sent (e.g., to the second application 120). If the transformation service is not running version n, then the transformation service responds with an error message (e.g., METADATA_MISMATCH). Upon receiving the error message, the second application can try again later.

Figure 8:
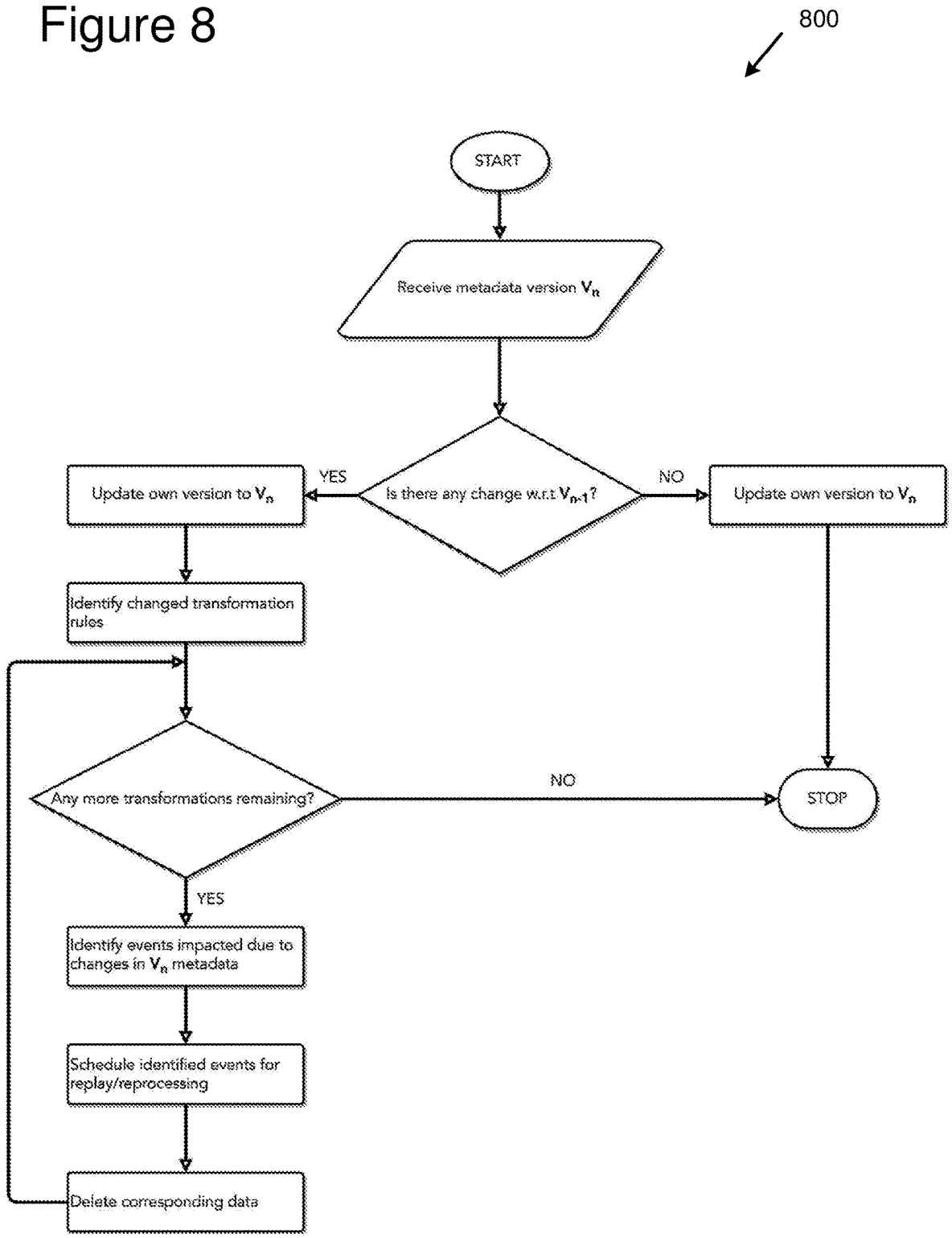
FIG. 8 is a flowchart of an example method for re-transforming data.

FIG. 8 is a flowchart of an example method 800 for re-transforming data. For example, the example method 800 can be performed by a transformation service (e.g., by transformation service 210) that has transformed some data using a previous metadata version n−1 and has now received a new metadata version n. If the new metadata version does not introduce any changes, then the transformation service updates to the new metadata version n. If the new metadata version introduces changes (e.g., updated domain entities, fields, transformations, etc.), then the transformation service updates to the new metadata version and reviews previously transformed data (e.g., that is still in its cache). For any transformed data that would change due to the new version, the transformed data is re-processed (e.g., re-transformed) and the old transformed data is deleted.

Figure 9:
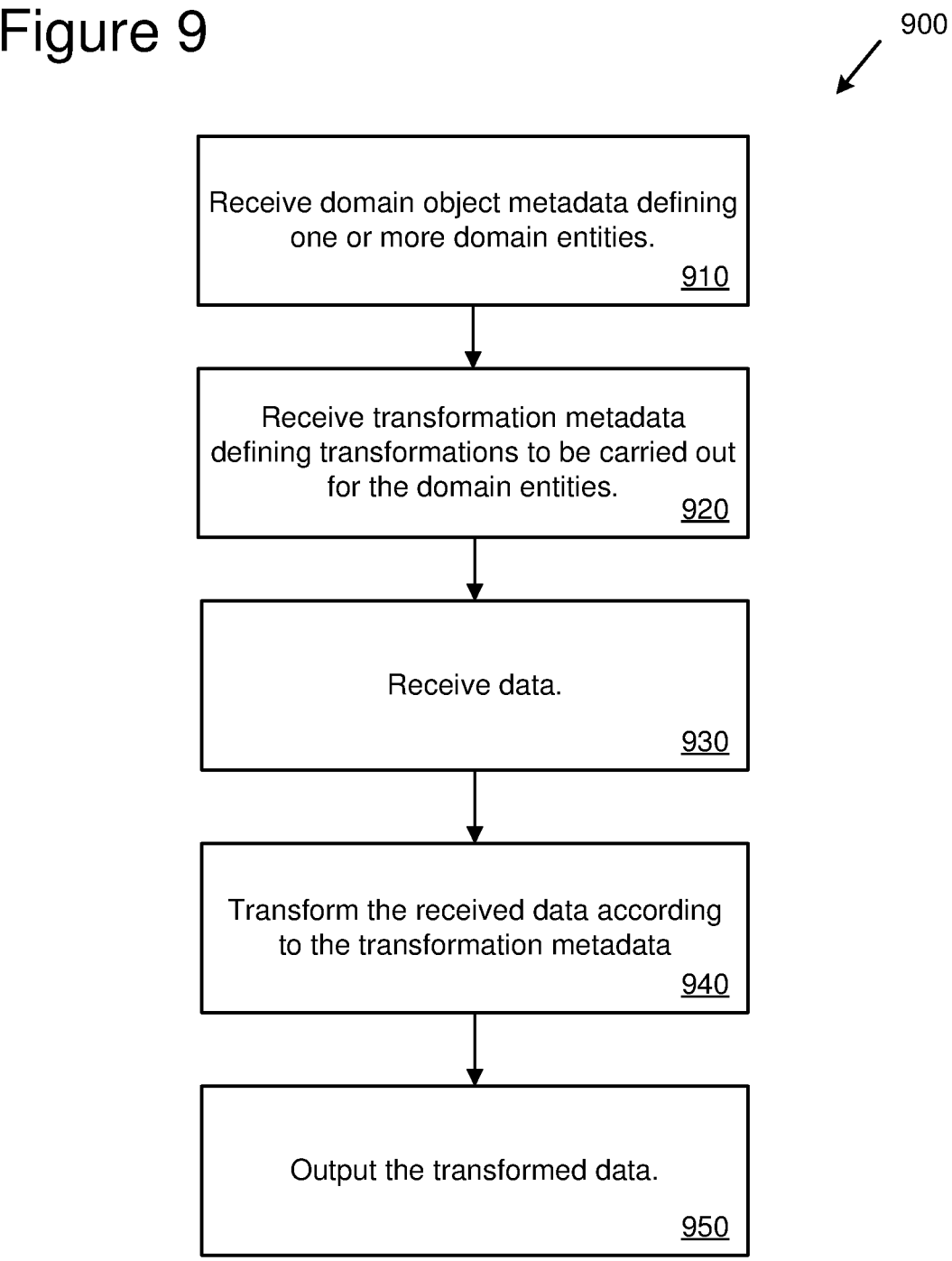
FIG. 9 is a flowchart of an example method for transforming data using exchanged metadata.

FIG. 9 is a flowchart of an example method 900 for transforming data using combined metadata. The example method 900 can be performed by one or more computing devices. For example, the example method 900 can be performed by a transformation service, such as transformation service 210.

At 910, domain object metadata is received. The domain object metadata defines one or more domain entities. The domain object metadata is associated with a first application (e.g., with first application 110). For example, the domain object metadata can be received as part of combined metadata (e.g., from a metadata service). The domain object metadata can also be received, separately or in a combined format, from another source (e.g., from the first application, from another service, etc.). In some implementations, the domain object metadata originates from the first application (e.g., the domain object metadata is generated by the first application). However, the domain object metadata can also originate from other sources.

At 920, transformation metadata is received. The transformation metadata defines transformations to be carried out for the one or more domain entities. The transformation metadata is associated with a second application (e.g., with second application 120). For example, the transformation metadata can be received as part of combined metadata (e.g., from a metadata service). The transformation metadata can also be received, separately or in a combined format, from another source (e.g., from the second application, from another service, etc.). In some implementations, the transformation metadata originates from the second application (e.g., the transformation metadata is generated by the second application). However, the transformation metadata can also originate from other sources.

At 930, data is received from the first application. The received data is formatted according to the domain object metadata. For example, the received data contains data elements for one or more of the domain entities defined by the domain object metadata. Using the above example domain object metadata defining the Requisition entity, the data can contain, internal order numbers, descriptions, addresses, and prices for one or more requisitions.

At 940, the received data is transformed according to the transformation metadata. Using the above example transformation metadata for transforming Requisition entities into PurchaseRequest entities, the fields of received data would be transformed. For example, the internalorder field (from the source Requisition entity) would be mapped to the OrderID and OrderNumber fields (from the destination PurchaseRequest entity), the description field would be mapped to the OrderDetails field and a language translation would be performed, the postaladdress field would be mapped to the destination field, and the price field would be mapped to the Cost field and a currency transformation would be performed.

At 950, the transformed data would be output. For example, the transformed data can be sent to the second application. The transformed data can also be saved to a buffer (e.g., waiting for a pull request or waiting to be reviewed due to a version mismatch).

Figure 10:
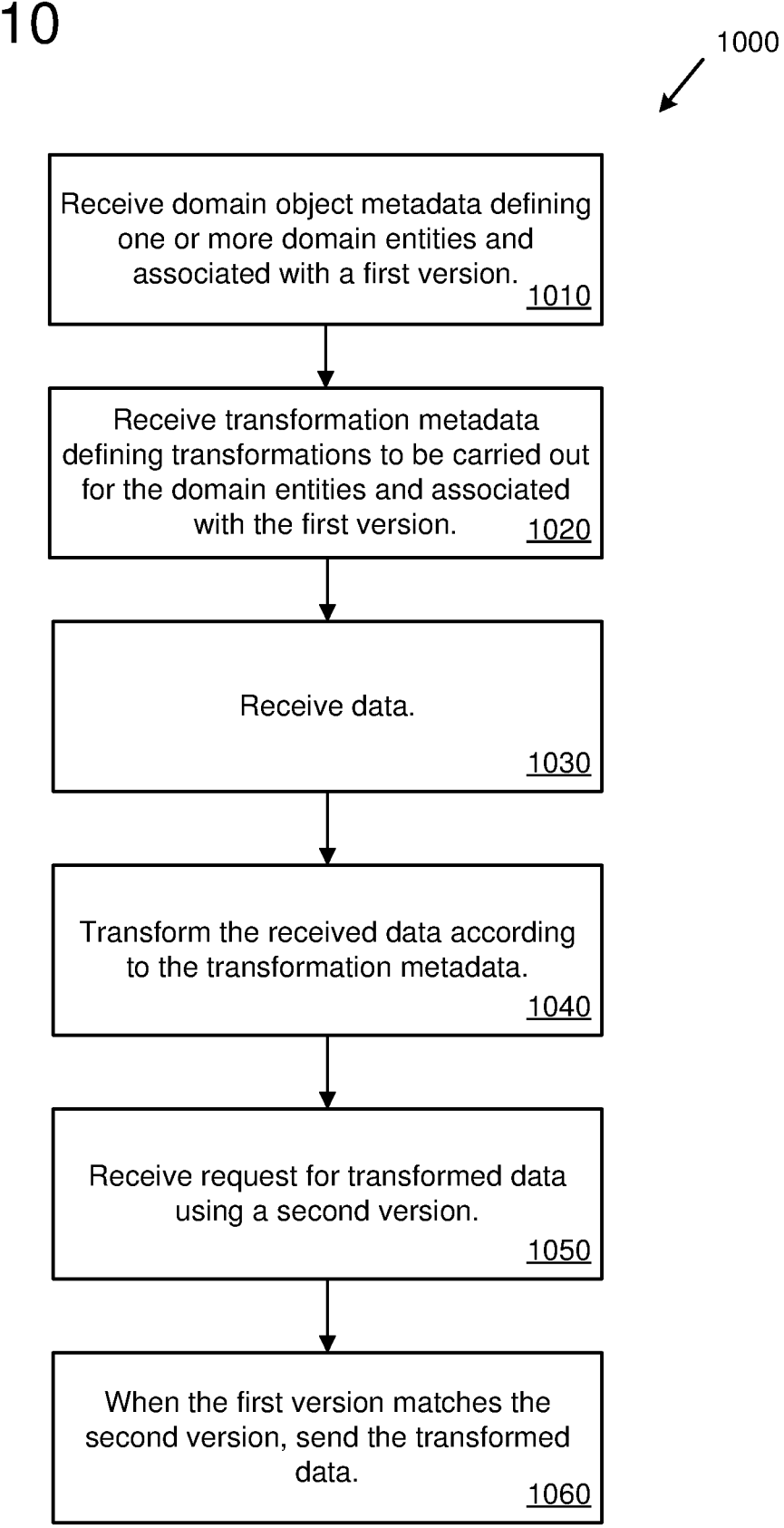
FIG. 10 is a flowchart of an example method for transforming data using exchanged metadata, including checking metadata versions.

FIG. 10 is a flowchart of an example method 1000 for transforming data using combined metadata, including checking metadata versions. The example method 1000 can be performed by one or more computing devices. For example, the example method 1000 can be performed by a transformation service, such as transformation service 210.

At 1010, domain object metadata is received. The domain object metadata defines one or more domain entities. The domain object metadata is associated with data produced by a first application (e.g., with first application 110). For example, the domain object metadata can be received as part of combined metadata (e.g., from a metadata service). The domain object metadata can also be received, separately or in a combined format, from another source (e.g., from the first application, from another service, etc.). The domain object metadata is associated with a first version.

At 1020, transformation metadata is received. The transformation metadata defines transformations to be carried out for the one or more domain entities. The transformation metadata is associated with data consumed by a second application (e.g., with second application 120). For example, the transformation metadata can be received as part of combined metadata (e.g., from a metadata service). The transformation metadata can also be received, separately or in a combined format, from another source (e.g., from the second application, from another service, etc.). The transformation metadata is associated with the first version. For example, the domain object metadata and the transformation metadata can be received as combined metadata (e.g., from a metadata service) where the combined metadata is associated with the first version (e.g., v0).

At 1030, data is received from the first application. The received data is formatted according to the domain object metadata. For example, the received data contains data elements for one or more of the domain entities defined by the domain object metadata. Using the above example domain object metadata defining the Requisition entity, the data can contain, internal order numbers, descriptions, addresses, and prices for one or more requisitions.

At 1040, the received data is transformed according to the transformation metadata. Transformation of the data is not blocked when the first version and the second version do not match. For example, when the first version and the second version do not match, the transformed data can be buffered and not sent to the second application (e.g., until the transformed data is evaluated).

At 1050, a request is received from the second application for transformed data using a second version. Upon receiving the request, the current version of the domain object metadata and the transformation metadata (in this case the first version) can be compared to the version received with the request for transformed data (in this case the second version).

At 1060, when the first version matches the second version (e.g., when the first version number is the same as the second version number, such as v0 and v0), the transformed data is sent to the second application.

When the first version does not match the second version (e.g., when the first version number is not the same as the second version number, such as v0 and v1), the received data is still transformed. In other words, transformation of the received data does not block when there is a version mismatch. For example, the received data can be transformed immediately when it is received using the current transformation metadata available (e.g., transformation does not have to wait until a request is received for transformed data). However, in this situation, the transformed data is buffered and not sent to the second device. When updated domain object metadata and updated transformation metadata is received for the second version, then the buffered transformed data can be evaluated and any data that would change due to the second version can be re-transformed.

Computing Systems

Figure 11:
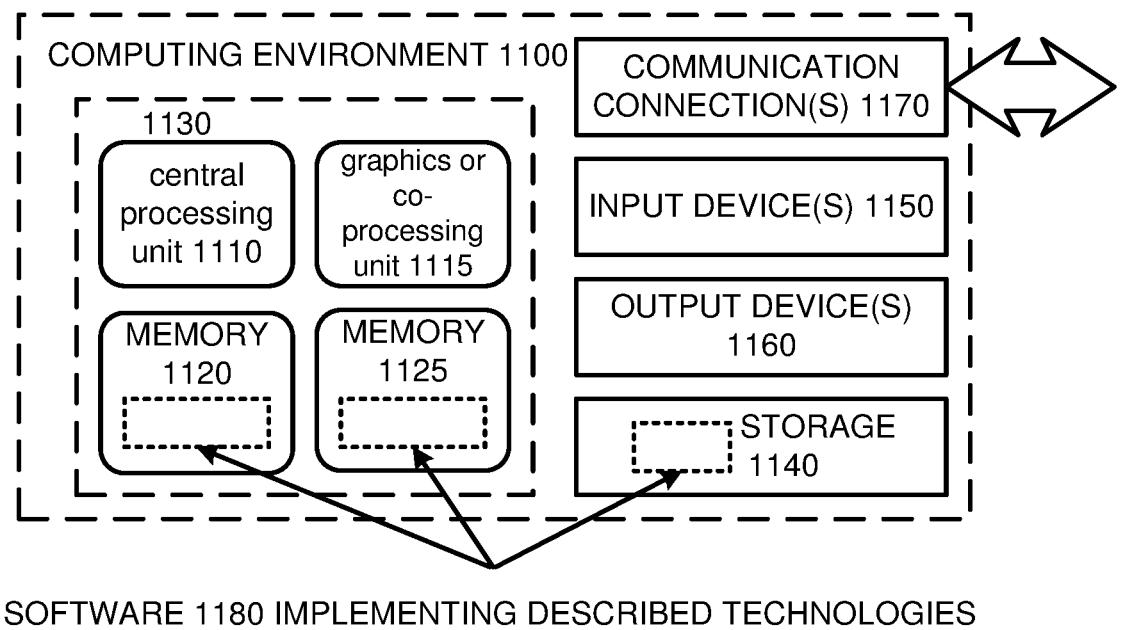
FIG. 11 is a diagram of an example computing system in which some described embodiments can be implemented.

FIG. 11 depicts a generalized example of a suitable computing system 1100 in which the described innovations may be implemented. The computing system 1100 is not intended to suggest any limitation as to scope of use or functionality, as the innovations may be implemented in diverse general-purpose or special-purpose computing systems.

With reference to FIG. 11, the computing system 1100 includes one or more processing units 1110, 1115 and memory 1120, 1125. In FIG. 11, this basic configuration 1130 is included within a dashed line. The processing units 1110, 1115 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 11 shows a central processing unit 1110 as well as a graphics processing unit or co-processing unit 1115. The tangible memory 1120, 1125 may be volatile memory (e.g., registers, cache, RAM), non-volatile memory (e.g., ROM, EEPROM, flash memory, etc.), or some combination of the two, accessible by the processing unit(s). The memory 1120, 1125 stores software 1180 implementing one or more innovations described herein, in the form of computer-executable instructions suitable for execution by the processing unit(s).

A computing system may have additional features. For example, the computing system 1100 includes storage 1140, one or more input devices 1150, one or more output devices 1160, and one or more communication connections 1170. An interconnection mechanism (not shown) such as a bus, controller, or network interconnects the components of the computing system 1100. Typically, operating system software (not shown) provides an operating environment for other software executing in the computing system 1100, and coordinates activities of the components of the computing system 1100.

The tangible storage 1140 may be removable or non-removable, and includes magnetic disks, magnetic tapes or cassettes, CD-ROMs, DVDs, or any other medium which can be used to store information in a non-transitory way and which can be accessed within the computing system 1100. The storage 1140 stores instructions for the software 1180 implementing one or more innovations described herein.

The input device(s) 1150 may be a touch input device such as a keyboard, mouse, pen, or trackball, a voice input device, a scanning device, or another device that provides input to the computing system 1100. For video encoding, the input device(s) 1150 may be a camera, video card, TV tuner card, or similar device that accepts video input in analog or digital form, or a CD-ROM or CD-RW that reads video samples into the computing system 1100. The output device(s) 1160 may be a display, printer, speaker, CD-writer, or another device that provides output from the computing system 1100.

The communication connection(s) 1170 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-executable instructions, such as those included in program modules, being executed in a computing system on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

The terms "system" and "device" are used interchangeably herein. Unless the context clearly indicates otherwise, neither term implies any limitation on a type of computing system or computing device. In general, a computing system or computing device can be local or distributed, and can include any combination of special-purpose hardware and/or general-purpose hardware with software implementing the functionality described herein.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

Cloud Computing Environment

Figure 12:
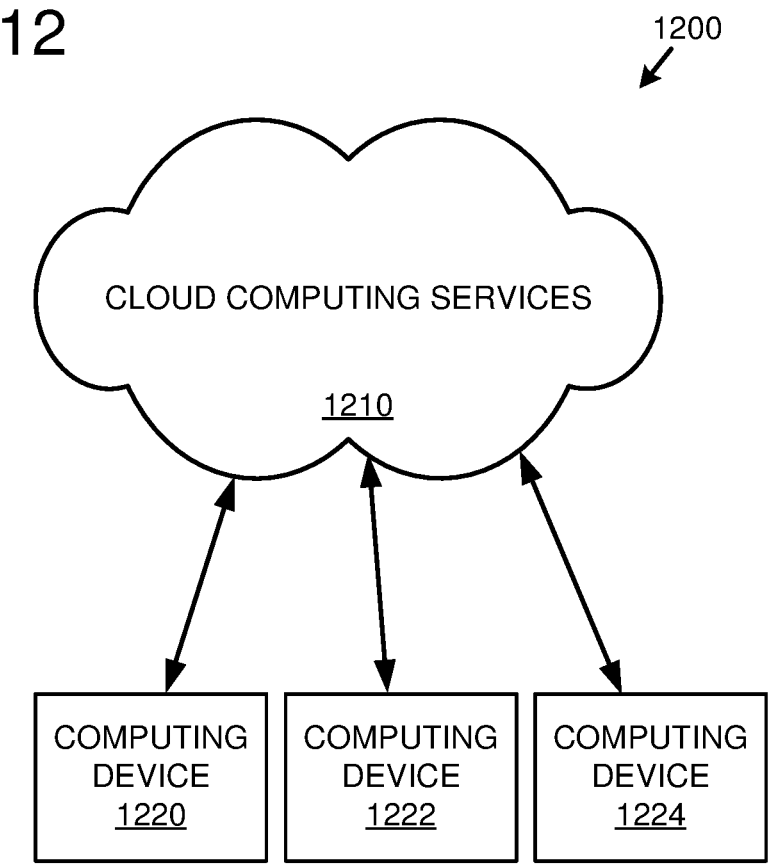
FIG. 12 is an example cloud computing environment that can be used in conjunction with the technologies described herein.

FIG. 12 depicts an example cloud computing environment 1200 in which the described technologies can be implemented. The cloud computing environment 1200 comprises cloud computing services 1210. The cloud computing services 1210 can comprise various types of cloud computing resources, such as computer servers, data storage repositories, database resources, networking resources, etc. The cloud computing services 1210 can be centrally located (e.g., provided by a data center of a business or organization) or distributed (e.g., provided by various computing resources located at different locations, such as different data centers and/or located in different cities or countries).

The cloud computing services 1210 are utilized by various types of computing devices (e.g., client computing devices), such as computing devices 1220, 1222, and 1224. For example, the computing devices (e.g., 1220, 1222, and 1224) can be computers (e.g., desktop or laptop computers), mobile devices (e.g., tablet computers or smart phones), or other types of computing devices. For example, the computing devices (e.g., 1220, 1222, and 1224) can utilize the cloud computing services 1210 to perform computing operators (e.g., data processing, data storage, and the like).

Example Implementations

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions or a computer program product stored on one or more computer-readable storage media and executed on a computing device (i.e., any available computing device, including smart phones or other mobile devices that include computing hardware). Computer-readable storage media are tangible media that can be accessed within a computing environment (one or more optical media discs such as DVD or CD, volatile memory (such as DRAM or SRAM), or nonvolatile memory (such as flash memory or hard drives)). By way of example and with reference to FIG. 11, computer-readable storage media include memory 1120 and 1125, and storage 1140. The term computer-readable storage media does not include signals and carrier waves. In addition, the term computer-readable storage media does not include communication connections, such as 1170.

Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, or any other suitable programming language. Likewise, the disclosed technology is not limited to any particular computer or type of hardware. Certain details of suitable computers and hardware are well known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub combinations with one another. The disclosed methods, apparatus, and systems are not limited to any specific aspect or feature or combination thereof, nor do the disclosed embodiments require that any one or more specific advantages be present or problems be solved.

The technologies from any example can be combined with the technologies described in any one or more of the other examples. In view of the many possible embodiments to which the principles of the disclosed technology may be applied, it should be recognized that the illustrated embodiments are examples of the disclosed technology and should not be taken as a limitation on the scope of the disclosed technology. Rather, the scope of the disclosed technology includes what is covered by the scope and spirit of the following claims.

What is claimed is:

1. A method, performed by one or more computing devices, for transforming data using exchanged metadata, the method comprising:

receiving domain object metadata, wherein the domain object metadata defines one or more domain entities, wherein the domain object metadata is associated with a first application, and wherein the domain object metadata is associated with a first version;

receiving transformation metadata, wherein the transformation metadata defines transformations to be carried out for the one or more domain entities defined by the domain object metadata, wherein the transformation metadata is associated with a second application, and wherein the transformation metadata is associated with the first version;

receiving, from the first application, data, wherein the data received from the first application is formatted according to the domain object metadata;

transforming the data according to the transformation metadata;

sending, to the second application, the transformed data;

receiving, from the first application, additional data;

receiving, from the second application, a request for transformed data using a second version of domain object metadata and transformation metadata;

determining that the first version and the second version do not match; and responsive to determining that the first version and the second version do not match, transforming the additional data according to the first version;

wherein transforming the additional data is not blocked when the first version and the second version do not match.

2. The method of claim 1, wherein the domain object metadata comprises:
entity names;
field names; and
field types.

3. The method of claim 1, wherein the transformation metadata comprises:
source field names;
destination field names; and
transformation operations.

4. The method of claim 1, further comprising:
determining whether a domain entity associated with the received data is present in the domain object metadata; and
upon determining that the domain entity associated with the received data is present, performing the transforming the data according to the transformation metadata.

5. The method of claim 1, further comprising:
receiving a data pull request from the second application; and
responsive to the data pull request, sending the transformed data to the second application.

6. The method of claim 1, further comprising:
receiving updated domain object metadata and/or updated transformation metadata that are associated with the second version;
identifying a portion of the transformed additional data that would not change due to the updated domain object metadata and/or the updated transformation metadata;
sending, to the second application, the portion of the transformed additional data; and
re-transforming any remaining transformed additional data that would change due to the updated domain object metadata and/or the updated transformation metadata.

7. The method of claim 1, wherein the domain object metadata and the transformation metadata are received from a metadata service, the method further comprising:
receiving domain object metadata defining domain entities associated with one or more additional applications; and
receiving, from the one or more additional applications, data to be transformed.

8. One or more computing devices comprising:
processors; and
memory;
the one or more computing devices configured, via computer-executable instructions, to perform operations for transforming data using exchanged metadata, the operations comprising:
receiving domain object metadata, wherein the domain object metadata defines one or more domain entities, wherein the domain object metadata is associated with data produced by a first application, and wherein the domain object metadata is associated with a first version;
receiving transformation metadata, wherein the transformation metadata defines transformations to be carried out for the one or more domain entities defined by the domain object metadata, wherein the transformation metadata is associated with data consumed by a second application, and wherein the transformation metadata is associated with the first version;
receiving, from the first application, data, wherein the data received from the first application is formatted according to the domain object metadata;
transforming the data according to the transformation metadata;
receiving, from the second application, a request for transformed data using a second version of domain object metadata and transformation metadata;
when the first version matches the second version, sending, to the second application, the transformed data; and
when the first version does not match the second version:
buffering the transformed data;
wherein transforming the data is not blocked when the first version and the second version do not match, and wherein the transformed data is not sent to the second application.

9. The one or more computing devices of claim 8, the operations further comprising:
when the first version does not match the second version:
receiving updated domain object metadata and/or updated transformation metadata that are associated with a third version;
responsive to determining that the third version matches the second version:
identifying a portion of the transformed data that would not change due to the updated domain object metadata and/or the updated transformation metadata;
sending, to the second application, the portion of the transformed data; and
re-transforming any remaining transformed data that would change due to the updated domain object metadata and/or the updated transformation metadata.

10. The one or more computing devices of claim 8, wherein transforming the data according to the transformation metadata is based upon matching domain entities associated with the received data in the domain object metadata.

11. The one or more computing devices of claim 8, the operations further comprising:
receiving a data pull request from the second application; and
responsive to the data pull request, sending the transformed data to the second application.

12. The one or more computing devices of claim 8, wherein the domain object metadata and the transformation metadata are received as combined metadata having the first version.

13. One or more computer-readable storage media storing computer-executable instructions for execution on one or more computing devices to perform operations for transforming data using exchanged metadata, the operations comprising:
receiving domain object metadata, wherein the domain object metadata defines one or more domain entities, wherein the domain object metadata originates from a first application, and wherein the domain object metadata is associated with a first version;
receiving transformation metadata, wherein the transformation metadata defines transformations to be carried out for the one or more domain entities defined by the domain object metadata, wherein the transformation metadata originates from a second application, and wherein the transformation metadata is associated with the first version;

receiving, from the first application, data, wherein the data received from the first application is formatted according to the domain object metadata;

transforming the data according to the transformation metadata;

sending, to the second application, the transformed data;

receiving, from the first application, additional data;

receiving, from the second application, a request for transformed data using a second version of domain object metadata and transformation metadata; and regardless of whether the first version and the second version match, transforming the additional data according to the first version;

wherein transforming the additional data is not blocked when the first version and the second version do not match.

14. The one or more computer-readable storage media of claim 13, wherein the domain object metadata and the transformation metadata are received as combined metadata from a metadata service.

15. The one or more computer-readable storage media of claim 13, the operations further comprising:

when the first version does not match the second version, buffering the transformed additional data; and when the first version matches the second version, sending the transformed additional data to the second application.

16. The one or more computer-readable storage media of claim 13, the operations further comprising:

receiving updated domain object metadata and/or updated transformation metadata that are associated with the second version;

identifying a portion of the transformed additional data that would not change due to the updated domain object metadata and/or the updated transformation metadata;

sending, to the second application, the portion of the transformed additional data; and re-transforming any remaining transformed additional data that would change due to the updated domain object metadata and/or the updated transformation metadata.

* * * * *